United States Patent
Chung et al.

(10) Patent No.: US 10,748,172 B2
(45) Date of Patent: Aug. 18, 2020

(54) INCREASING SOCIAL MEDIA PRESENCE USING MACHINE-LEARNING RELEVANCE TECHNIQUES

(71) Applicant: Twitter, Inc., San Francisco, CA (US)

(72) Inventors: Wook Jin Chung, Sunnyvale, CA (US); Kiryl Lashuk, San Francisco, CA (US); Kelly Huffman, Belmont, CA (US)

(73) Assignee: Twitter, Inc., San Francisco, CA (US)

(*) Notice: Subject to any disclaimer, the term of this patent is extended or adjusted under 35 U.S.C. 154(b) by 504 days.

(21) Appl. No.: 15/449,469

(22) Filed: Mar. 3, 2017

(65) Prior Publication Data
US 2018/0253753 A1 Sep. 6, 2018

(51) Int. Cl.
| | |
|---|---|
| G06Q 30/02 | (2012.01) |
| G06N 20/00 | (2019.01) |
| G06Q 10/10 | (2012.01) |
| H04L 12/58 | (2006.01) |
| H04L 29/08 | (2006.01) |
| G06Q 50/00 | (2012.01) |

(52) U.S. Cl.
CPC ......... *G06Q 30/0244* (2013.01); *G06N 20/00* (2019.01); *G06Q 10/10* (2013.01); *G06Q 30/0269* (2013.01); *G06Q 30/0275* (2013.01); *H04L 51/32* (2013.01); *H04L 67/306* (2013.01); *G06Q 50/01* (2013.01)

(58) Field of Classification Search
USPC .................................................... 1/1; 705/5
See application file for complete search history.

(56) References Cited

U.S. PATENT DOCUMENTS

2016/0027031 A1* 1/2016 Bubic ................ G06Q 30/0214
                                                                    705/5
2017/0099253 A1* 4/2017 Muthukumar .......... H04L 51/32

OTHER PUBLICATIONS

International Search Report and Written Opinion for International Application No. PCT/US2017/064699, dated Mar. 2, 2018, 13 pages.

* cited by examiner

*Primary Examiner* — Saba Dagnew
(74) *Attorney, Agent, or Firm* — Brake Hughes Bellerman LLP

(57) ABSTRACT

According to an implementation, a system includes a social media messaging platform configured to exchange messages, over a network, among a plurality of computing devices. The exchange of messages is based on a connection graph stored on the messaging platform. The social media messaging platform includes a registration manager configured to register an account for an entity to boost a social media presence of the entity on the social media messaging platform, and a social media presence booster having a machine-learning relevance engine configured to programmatically match the entity's content with relevant entities. The social media presence booster is configured to automatically and programmatically boost the entity's content to the relevant entities, and increase, over time, a number of connections in the connection graph between the account and other accounts on the social media messaging platform in response to the boosted content.

25 Claims, 8 Drawing Sheets

INCREASING SOCIAL MEDIA PRESENCE USING MACHINE-LEARNING RELEVANCE TECHNIQUES

BACKGROUND

The instant specification relates to digital information retrieval in the context of discovery in a social media platform.

A social media messaging platform may facilitate the exchange of millions or hundreds of millions of social media messages among its users. The messages exchanged on the platform often can provide users of the platform the latest update or reporting on current events in the user's timeline (i.e., a chronological stream of messages from users associated with or linked to the user or promoted by the social media messaging platform). Also, some users may use a social media messaging platform to provide information that targets existing and potential contacts. Such users may not necessarily focus on consuming content on the timeline, but rather on broadcasting content to contacts and potential contacts.

Growing a social media presence for a user on a social media messaging platform can be relatively challenging, especially when the user seeking to discover and acquire contacts or followers previously unknown to the user, but who would regardless be valuable or otherwise interesting to the user. In one example, when an entity initially creates an account on the messaging platform and has zero followers, propagation of a message according to only to the entity's follow graph will not result in the message being distributed. In some instances, the entity has professional or business reasons in seeking to engage with others with whom the entity has yet to be acquainted. Besides acquiring new followers, the entity may wish to communicate a message beyond their current set of followers (e.g., inform potential customers and generate public awareness of a new product or service) in a manner that targets the most relevant potential customers. However, implementing campaign strategies for content promotion on existing social media platforms may be ineffective, labor and time intensive, and may lack the technical framework to programmatically amplify content distribution to other users of the platform in an efficient manner.

SUMMARY

A social media platform may boost a user's profile (which may contain information about the user) to other platform users that may be interested in the user's profile. The selection of which users to receive the user's profile is determined according to a machine-learning relevance algorithm. The machine-learning relevance algorithm may receive input signals and predict which users have a higher chance of being interested in the user's profile. Also, the social media platform may programmatically amplify selected messages shared by the user to a wider audience in order to communicate the message beyond its current set of followers. Similar to the profile boost, the selection of which users to receive the amplified message is determined according to the machine-learning relevance algorithm that programmatically matches the user's message to users that may be interested in that message. The timing and selection of which boost option (e.g., profile boost, activity boost) to activate may be programmatically controlled in order to maximize the efficiency of content promotion for the individual user and across the system as a whole.

According to an implementation, a system includes a social media messaging platform configured to exchange messages, over a network, among a plurality of computing devices each of which is executing a social media messaging application. The exchange of messages is based on a connection graph stored on the messaging platform. The connection graph includes nodes representing accounts of entities, and connections between the nodes representing relationships between the accounts. The social media messaging platform includes a registration manager configured to register a subscription-based account for a subscribing entity to boost a social media presence of the subscribing entity on the social media messaging platform, and a social media presence booster having a machine-learning relevance engine configured to programmatically match content associated with the subscription-based account with a plurality of relevant entities on the social media messaging platform. The social media presence booster is configured to automatically and programmatically boost the content associated with the subscription-based account, during a promotional cycle of the subscription-based account, to the plurality of relevant entities determined by the relevance engine. The social media presence booster is configured to increase, over time, a number of connections in the connection graph between the subscription-based account and the accounts of entities on the social media messaging platform in response to the boosted content.

According to another implementation, a computer-implemented method includes registering a subscription-based account for a subscribing entity to boost a social media presence of the subscribing entity on the social media messaging platform, programmatically matching content associated with the subscription-based account with a plurality of relevant entities according to a machine-learning relevance algorithm, programmatically boosting the content associated with the subscription-based account, during a promotional cycle of the subscription-based account, to the plurality of relevant entities determined by the machine-learning relevance algorithm, and increasing, over time, a number of connections in the connection graph between the subscription-based account and the accounts of entities on the social media messaging platform based on the boosted content.

According to another implementation, a non-transitory computer-readable medium has executable instructions that cause at least one processor to register a subscription-based account for a subscribing entity to boost a social media presence of the subscribing entity on the social media messaging platform, programmatically match content associated with the subscription-based account with a plurality of relevant entities according to a machine-learning relevance algorithm, programmatically boost the content associated with the subscription-based account to the plurality of relevant entities determined by the machine-learning relevance algorithm, dynamically adjust a boosting level for the programmatically boosting at multiple different times during a promotional cycle of the subscription-based account based on one or more programmatically generated signals, and increase, over time, a number of connections in the connection graph between the subscription-based account and the accounts of entities on the social media messaging platform during the promotional cycle based on the boosted content.

One or more of the implementations of the subject matter described herein can be implemented so as to realize one or more of the following advantages: naturally grow followers without any effort on the part of the subscribing entity (e.g., zero-effort media campaign), increase the effectiveness of content distribution by targeting only the most relevant users (at the most relevant time) and delivering content in a manner that tracks and gradually builds relationships between the subscriber and other users, promote a healthy presence on the messaging platform by selecting boosted content having a higher quality, intelligently control the level of boosting for individual subscribers and across the system as a whole, and/or efficiently manage system resources for implementing boost options.

The details of one or more implementations are set forth in the accompanying drawings and the description below. Other features will be apparent from the description and drawings, and from the claims.

DETAILED DISCLOSURE

Figure 1:
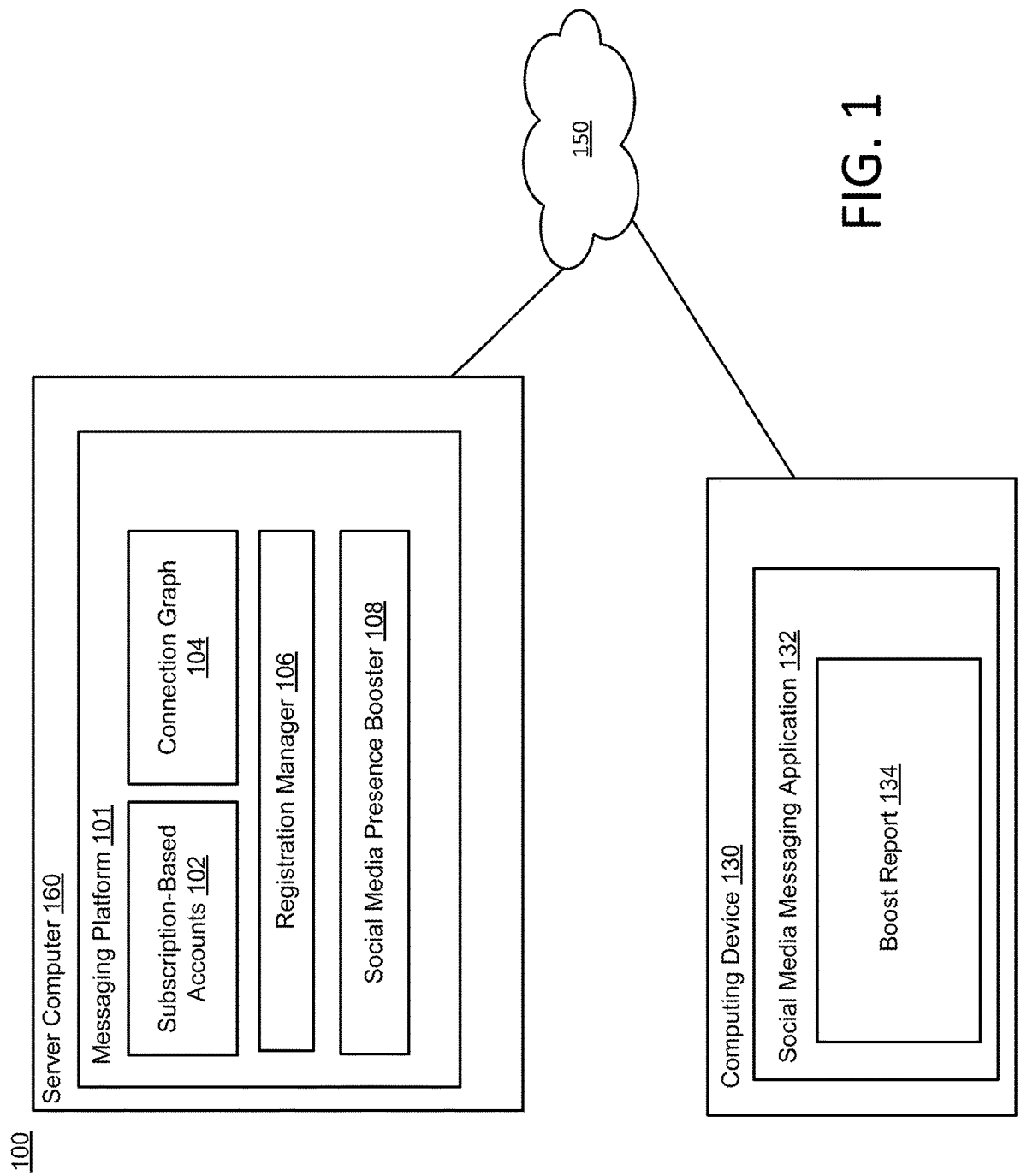
FIG. 1 is a schematic diagram of a system having a messaging platform that includes a social media presence booster configured to boost the social media presence of subscribing entities on the messaging platform according to an implementation.

FIG. 1 is a schematic diagram of a system 100 having a messaging platform 101 that includes a registration manager 106 configured to register entities for subscription-based accounts 102 and a social media presence booster 108 configured to boost the social media presence of the subscribing entities on the messaging platform 101 according to an implementation. The messaging platform 101 executes on a server computer 160. The server computer 160 may be a single computing device, or may be a representation of two or more distributed computing devices communicatively connected to share workload and resources.

The messaging platform 101 is a social media messaging platform for facilitating real-time communication between user devices (one of which is shown as computing device 130). The messaging platform 101 may store millions of accounts of entities (e.g., individuals, businesses, pseudonym accounts, novelty accounts, etc.). One or more users of each account may use the messaging platform 101 to send messages to other accounts inside and/or outside of the messaging platform 101.

The messaging platform 101 may be configured to enable users to communicate in "real-time", i.e., to converse with other users with minimal delay and to conduct a conversation with one or more other users during simultaneous sessions. In other words, the messaging platform 101 may allow a user to broadcast messages and may display the messages to one or more other users within a reasonable time frame so as to facilitate a live conversation between users. Recipients of a message may have a predefined graph relationship with an account of the user broadcasting the message, as provided in a connection graph 104 stored on the messaging platform 101. The connection graph 104 is a data structure representing relationships (e.g., connections, links) between the accounts of the messaging platform 101. Relationships may include following, friending, subscribing, tracking, liking, tagging, and/or etc. An entity is directly connected to another entity in the connection graph 104 when the two entities are connected by a path length of one.

The computing device 130 includes a social media messaging application 132 configured to communicate with the messaging platform 101 over a network 150. The social media messaging application 132 may be a native application executing on an operating system of the computing device 130 or may be a web-based application executing on the server computer 160 (or other server) in conjunction with a browser-based application of the computing device 130. The computing device 130 may access the messaging platform 101 via the network 150 through the use of any type of network connections and/or application programming interfaces (APIs) in a manner that permits the social media messaging application 132 and the messaging platform 101 to communicate with each other.

The computing device 130 may be a mobile computing device (e.g., a smart phone, a PDA, a tablet, or a laptop computer) or a non-mobile computing device (e.g., a desktop computing device). The computing device 130 also includes various network interface circuitry, such as for example, a mobile network interface through which the computing device 130 can communicate with a cellular network, a Wi-Fi network interface with which the computing device 130 can communicate with a Wi-Fi base station, a Bluetooth network interface with which the computing device 130 can communicate with other Bluetooth devices, and/or an Ethernet connection or other wired connection that enables the computing device 130 to access the network 150.

Growing a social media presence for an entity (e.g., a small company entity) on the messaging platform 101 can be relatively challenging. As indicated above, when an entity initially creates an account on the messaging platform 101, the account may have zero followers (e.g., no links to the account of the company entity in the connection graph 104). As such, when that entity broadcasts a message on the messaging platform 101, other users may not discover the message, because the timeline of users is generally populated with content from linked accounts. Furthermore, the entity may wish to communicate a message beyond their current set of followers (e.g., inform potential customers of a new product or service) in a manner that targets the most relevant potential customers.

In further detail, the social media presence booster 108 is configured to automatically and programmatically promote the subscriber's content (e.g., a profile of the subscriber, content of messages broadcasted by the subscribing entity) to a wider audience of users on the messaging platform 101. The audience of users selected to which the subscriber's content is promoted can be selected based on criteria that may indicate that the selected users may be interested in the subscriber's content. In some examples, the social media presence booster 108 may periodically boost the subscriber's profile at different points in the promotional cycle to users of unlinked accounts that have a higher likelihood of being interested in the promoted profile. In this manner, the social media presence booster 108 can boost the social media presence of the subscribing entity on the messaging platform 101 in a manner that requires zero or minimal effort on the part of the subscribing entity. For example, this type of boost may be continuously applied different times during the subscriber's promotional cycle, and the subscriber may gain additional connections within the connection graph 104 without any effort on the part of the subscribing entity.

Furthermore, the social media presence booster 108 may selectively boost the subscriber's activity on the messaging platform 101 to a wider audience (e.g., beyond those accounts linked to the subscription-based account 102). For example, the subscribing entity may broadcast a message on the messaging platform 101, which is then shown to users of accounts linked to the subscriber's account in the connection graph 104. However, the social media presence booster 108 may programmatically determine to amplify that message to users of unlinked accounts that have a higher likelihood of being interested in the promoted message. In this manner, based on the profile boost and/or the activity boost, the social media presence booster 108 may increase, over time, the number of connections in the connection graph 104 between the subscription-based account 102 and other accounts on the messaging platform 101, as well as increase the recall, awareness, engagement, and/or conversation with the content of the subscriber.

The social media presence booster 108 is configured to implement a machine-learning relevance algorithm (by a relevance engine 220 shown in FIG. 2) that programmatically matches the subscriber's content with relevant users of the messaging platform 101 for the profile boost and the content boost. The machine-learning relevance algorithm may be a type of artificial intelligence (AI) that provides one or more computers with the ability to learn about the relevance between content and users without being explicitly programmed. The machine-learning relevance algorithm may receive input signals and predict which users are relevant to the content to be boosted using statistical analysis and/or predictive analytics to predict which users have a higher chance of being interested in the promoted content. Input signals to the machine learning resources include one or more signals representing the underlying content, one or more signals representing information about the subscribing entity, and one or more signals representing user models of the users of the messaging platform 101.

Also, where authorized by the user, the input signals further include preferences of users as the system 100 has inferred from the users' previous engagements, which include selections of social media messages to read, re-post, or about which to comment. For example, the machine-learning relevance algorithm may leverage all information about the platform's users and their behavior on the messaging platform 101 including those engagements with the promoted content and those engagements with organic activity on the messaging platform 101. In other words, the machine-learning relevance algorithm for the profile boost and the activity boost can incorporate all activity (e.g., organic activity and promoted activity) on the messaging platform 101, from subscription-based accounts 102 and non-subscription-based accounts. To improve its accuracy at predicting which users are relevant to the promoted content, the machine-learning relevance algorithm periodically adjusts its parameters, including the weights applied to input signals, based on the actual selections of the user. For example, as the users interact with the promoted content and non-promoted content across the messaging platform 101, these signals (e.g., both organic signals and promoted signals) are included in machine-learning resources, and the machine-learning relevance algorithm may programmatically adjust one or more of its parameters to improve its accuracy at predicting which users are relevant to the content to the promoted.

The social media presence booster 108 may transmit the promoted (or boosted) content, over the network 150, to be displayed within one or more parts of the social media messaging application 132 for the users that are determined as relevant to the promoted content. For example, with respect to the profile boost, the social media presence booster 108 may insert the subscriber's profile in a particular area of the user interface for the users that are determined as relevant by the machine-learning relevance algorithm to inform the relevant users about the subscribing entity. In some examples, the profile boost may suggest that a user establish a relationship with the subscribing entity. In one example, if the subscribing entity is a pizza store in New York City, the machine-learning relevance algorithm may determine a set of relevant users within the area of the pizza store (e.g., not a user in San Francisco), and promote that profile to those relevant users. Also, it is noted that the relevance determination may not only be based on the locations of users with respect to the subscribing entity, but also whether those users' activity have indicated an interest in the type of products/services offered by the subscribing entity, as well as other platform activity that indicate they may be interested in the subscribing entity.

In some examples, with respect to the activity boost, the social media presence booster 108 may insert a message shared by the subscribing entity in a timeline of the users that are determined as relevant to the promoted content in order to boost a particular message to a wider audience. In one example, the subscribing entity may have a new product or service in which the subscribing entity would promote to all potential customers (e.g., including those accounts that are linked to the subscription-based account 102 and those accounts that are not linked to the subscription-based account 102), and the subscribing entity may post a message on the messaging platform 101 about that product or service that is sent to the users having connections to the subscription-based account 102 within the connection graph 104. However, the social media presence booster 108 may select that message for boosting, and also provide that message to the relevant users having accounts that are not linked to the subscription-based account 102 in order inform a wider audience about the new product or service. In one example, if the subscribing entity is the pizza store in New York City, the machine-learning relevance algorithm may determine a set of users within a certain radius of the location of the pizza store that are likely to be potential customers of the pizza store, and the social media presence booster 108 may insert a particular message shared by the pizza store about a certain promotion or coupon into a timeline of the relevant users at a relevant time (e.g., around dinner or lunch time).

In this manner, users may view and/or interact with the promoted content, and then decide to link to the subscription-based account 102 (e.g., follow, friend, subscribe, track, etc.). Therefore, over time, the number of links to the subscription-based account 102 in the connection graph 104 may increase, thereby increasing the social media presence of the subscribing entity on the messaging platform 10, as well as increase the recall, awareness, engagement, and/or conversation with the content of the sub scriber.

The registration manager 106 may register an entity for subscription-based media distribution (thereby establishing a subscription-based account 102) based on information received from the subscribing entity. In one example, if a user is new to the messaging platform 101, the user may create an account and a profile that includes information about the user. Then, the user may convert that account to the subscription-based account 102. In other examples, a user may have already been using the messaging platform 101 using an existing account, and the user now wants to sign up for subscription-based media distribution on the messaging platform 101. In this example, the existing account would be converted to the subscription-based account 102, and the user's organic activity on its account would be imported to the subscription-based account 102.

The registration manager 106 may receive information about the underlying entity from the subscribing entity, and store this information in conjunction with the subscription-based account 102. For example, the user may provide a description of the entity, the type of entity, its location, the products or services offered by the entity, the goal(s) of the entity, whether the entity is local, internet-based, and/or a description of the type of potential customers of the entity and where they might be located. Also, the user may provide information about the frequency of purchase from customers. For example, the frequency of purchase for a pizza store may be 1-2 times a month, while the frequency of purchase for a gardening equipment store may be once every 6 months. The frequency of purchase may be helpful in building a relationship between the subscribing entity and the users on the messaging platform 101, as well as managing the life-time value of the customers, as further described later in the disclosure.

The registration manager 106 may receive a selection of a boost tier among a plurality of boost tiers, where each boost tier indicates a different level of boost provided by the social media presence booster 108. The boost tiers may be associated with different fixed recurring fees (e.g., monthly, quarterly, yearly subscription fees). Some of the examples throughout this disclosure specify monthly fixed fees, but it is understood that the embodiments may encompass any type of recurring subscription fee. A lower boost tier may be tied to a first monthly fee, where the social media presence booster 108 can be expected to boost the number of followers (or accounts linked to the subscription-based account 102 in the connection graph 104) by 10-30 per month. A higher boost tier may be tied to a second monthly fee that can be higher than the first monthly fee, where the social media presence booster 108 can be expected to boost the number of followers by a higher amount, e.g., 50-100 per month. For example, in the case of a new account on the messaging platform 101, the newly created account may have zero followers so growing the social media presence by 10-30 followers per month may be suitable for the subscribing entity. However, in the case of an existing account having thousands of existing followers, the subscribing entity may desire a more resource-intensive campaign, and may select a higher boost tier. In addition, with respect to the activity boost, a higher boost tier may provide an increased boost level for promoting the subscribing entity's activity on the messaging platform. For example, if the subscribing entity selects a higher boost tier, the social media presence booster 108 may boost the subscribing entity's activity to a larger pool of users, increase the frequency of when the activity boost occurs, and/or increase the amount of messages selected for inclusion within the activity boost, than what may be provided by a lower boost tier.

Upon activation of the account to the subscription-based account 102, the social media presence booster 108 may begin to boost the social media presence of the subscription-based account 102 on the messaging platform 101 during its promotional cycle. Then, over time, and without effort on the behalf of the subscribing entity, the subscription-based account 102 may increase its number of links within the connection graph 104 without creating and sharing any messages on the messaging platform 101 (e.g., by implementing a boost option that promotes the profile of the subscription-based account 102 to relevant users).

Figure 5:
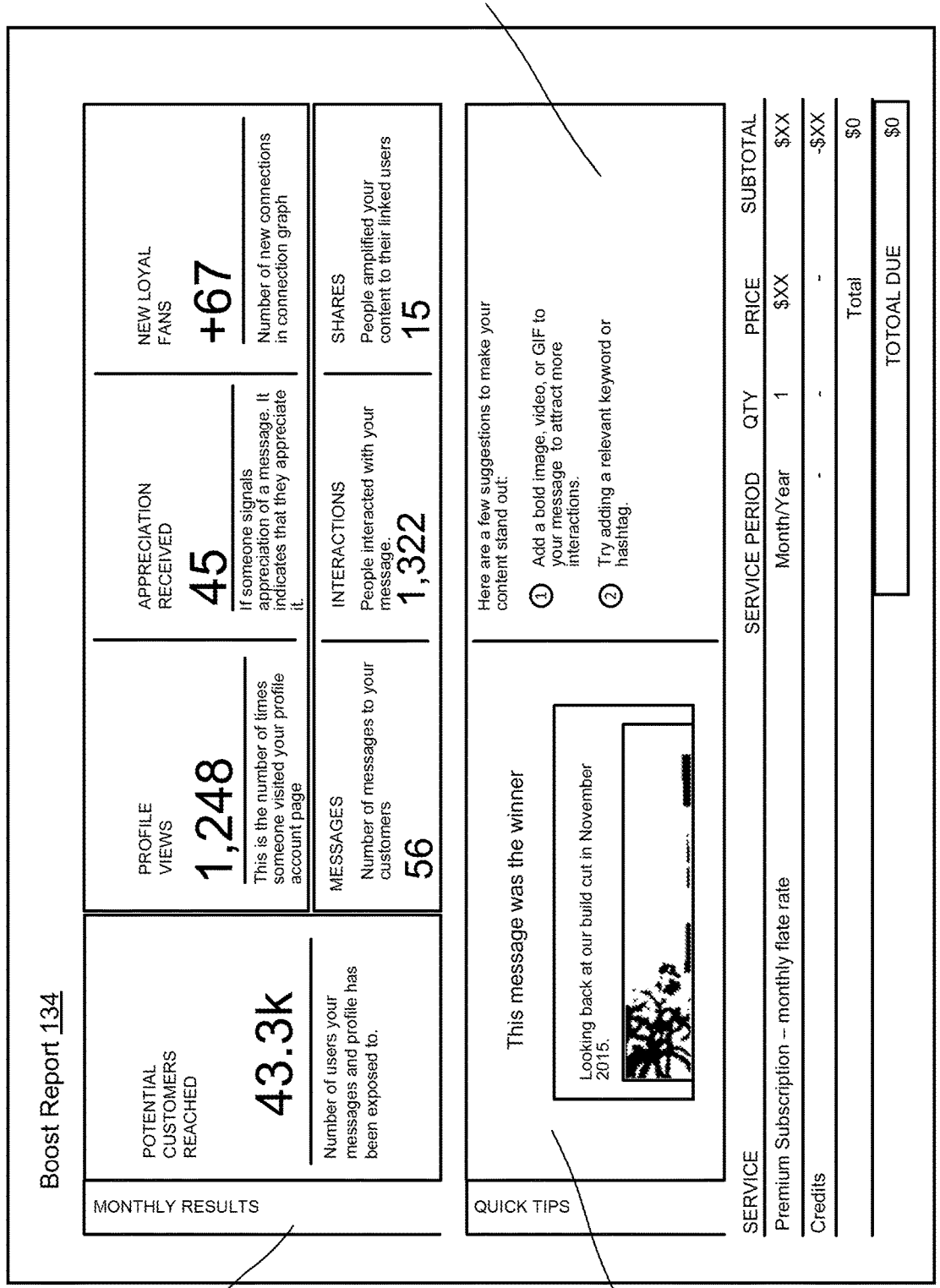
FIG. 5 illustrates an example screenshot of a boost report provided by the system of FIG. 1 according to an implementation.

The social media presence booster 108 may generate a boost report 134 (on-demand, and/or periodically) that provides presence metrics 225 so that the subscribing entity can view its increased social media presence as provided by the social media presence booster 108. FIG. 5 illustrates an example screenshot of the boost report 134 provided by the system 100 according to an implementation.

The social media presence booster 108 may track and calculate the presence metrics 225 associated with the social media presence on the messaging platform 101 (e.g., the effectiveness of the implemented boost options), and provide the presence metrics 225, over the network 150, to the subscribing entity. In some examples, the social media presence booster 108 may provide the presence metrics 225 in a user interface of the social media messaging application 132 in the form of the boost report 134.

The social media presence booster 108 may track the number of times users viewed the profile of the subscription-based account 102, the number of messages sent, the number of new linked accounts, the number of engagements with its messages such as the number of times users interacted with the messages, the number of shares, the amount of appreciation signals received (e.g., likes, hearts, etc.). Also, the social media presence booster 108 may identify a message 227 that received the most engagements (e.g., identify the best message(s)). In some examples, the social media presence booster 108 may identify tips 229 on increasing the social media presence on the messaging platform 101. For example, the social media presence booster 108 may suggest various tips on creating messages such as adding a bold image, video or GIF to the message, or adding a relevant keyword or hashtag, etc.

Figure 2:
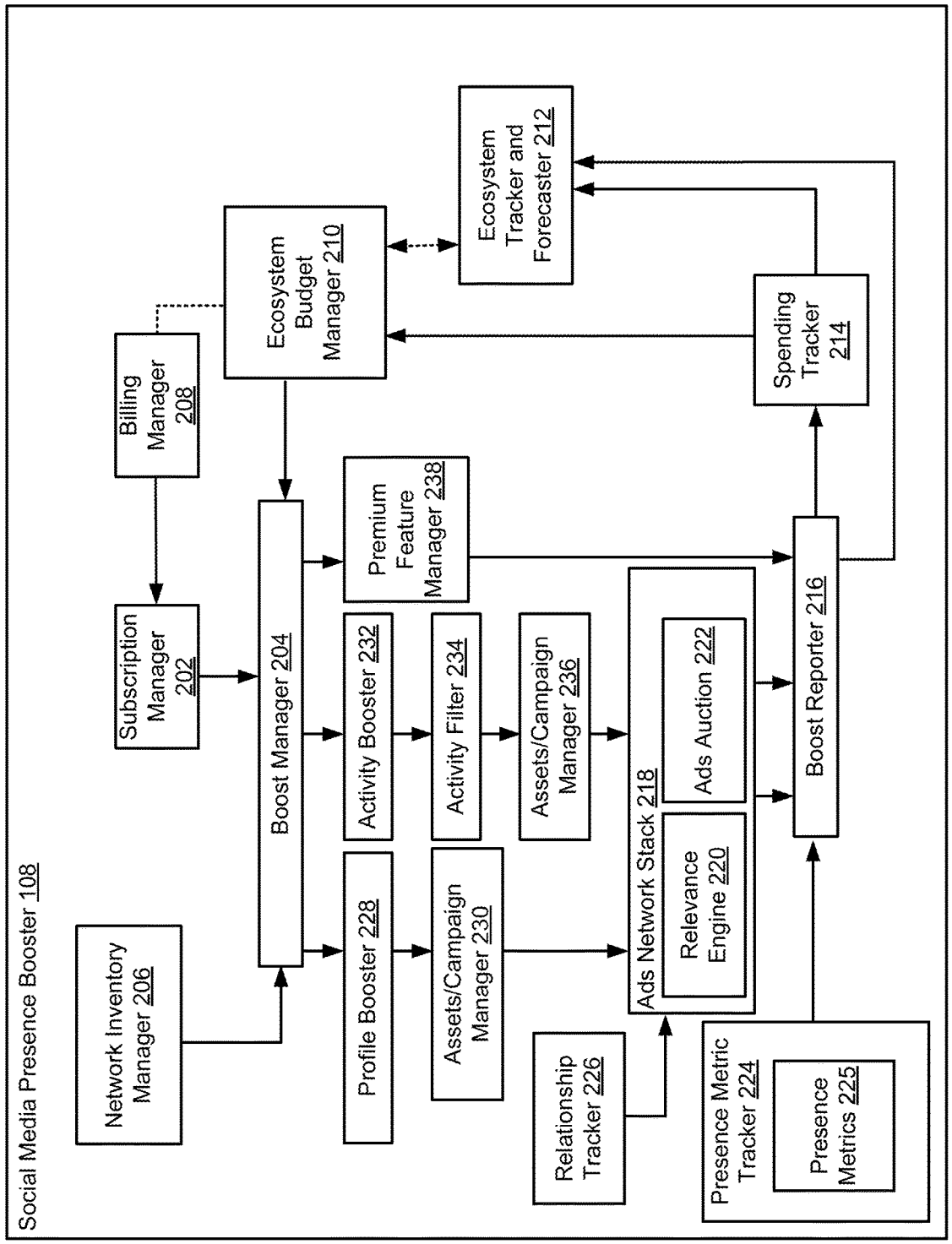
FIG. 2 illustrates a schematic diagram of the social media presence booster of FIG. 1 according to an implementation.

FIG. 2 illustrates a schematic diagram depicting the social media presence booster 108 in greater detail according to an implementation.

The social media presence booster 108 may include a subscription manager 202 configured to manage the individual subscription-based accounts 102. In some examples, the subscription manager 202 and the registration manager 106 of FIG. 1 are the same component handling both the registration and the management of the subscription-based accounts 102.

The subscription manager 202 is configured to record and store the corresponding boost tier, the periodic (i.e., monthly) billing/promotion cycle (referred to as promotion cycle), the monthly budget, and the remaining budget in the current cycle. For example, the subscription manager 202 may record the selected boost tier, and the dates for the promotion cycle. The promotion cycle may be the periodic time frame in which the subscriber's content is boosted and then billed. As indicated above, each boost tier is associated with a fixed periodic fee. As the social media presence booster 108 is boosting the subscriber's content during the promotion cycle, media costs are incurred. The media costs may be the costs associated with boosting the subscriber's content (e.g., a fixed first amount per profile boost, a fixed second amount per activity boost), which are established by the messaging platform 101. In some examples, media costs may fluctuate based on the amount of demand by other subscribing entities to promote content at a particular time. For example, if there is low demand for the boosted content for a given subscribing entity, then the boost cost may be relatively cheap. However, if the demand is relatively high, then the boost cost will be high.

In some examples, in contrast to the fixed subscription fee, the media budget for an individual subscription-based account 102 is not fixed, but rather is dynamically determined based on the quality of the subscribing entity's activity on the messaging platform 101, as well as the overall budget across all subscription-based accounts 102, as further described below. The subscription manager 202 is configured to record the boost tier, the periodic promotion cycle, the monthly budget, and configured to compute the remaining budget at any point during the promotion cycle. A billing manager 208 is configured to manage the monthly billing of subscription-based accounts 102.

Generally, a boost manager 204 is configured to evaluate and determine a media budget for the subscription-based account 102 relative to the budget of the selected boost tier of the subscription-based account 102 and relative to the overall budget from all of the subscription-based accounts 102 on the messaging platform 101. For example, the boosting of the subscriber's profile according to a first media campaign (e.g., follower campaign) and the boosting of the subscriber's activity on the messaging platform 101 according to a second media campaign (e.g., amplification campaign) are associated with variable or fixed media costs. As the social media presence booster 108 boosts the social media presence of the subscription-based account 102, media costs are incurred over the promotional cycle. Since one of the media campaigns (e.g., the follower campaign) may be constantly running, the boost manager 204 may estimate that the follower campaign to incur certain media costs for the month, and then use the remaining budget, as well as potentially some of the overall surplus budget across all of the subscription-based accounts 102, to boost some or all of the messages shared by the subscription-based account 102 according to the amplification campaign.

In further detail, the boost manager 204 is configured to manage and control which boost options (e.g., profile booster 228, activity booster 232, etc.) are applied to the individual subscription-based accounts 102 in view of the individual's overall monthly media budget (and remaining budget at a particular instance during the promotion cycle) that is received from the subscription manager 202, overall budget allocation information received from an ecosystem budget manager 210, and/or the amount of resources used by an ads network stack 218 computed by and received from a network inventory manager 206.

In some examples, the ecosystem budget manager 210 may programmatically balance the budget across all subscription-based accounts 102 within the messaging platform 101. Since the fees associated with the boost tiers are fixed, but the media costs are dynamic, the ecosystem budget manager 210 may compute an overall budget surplus across all subscription-based accounts 102, and dynamically allocate additional media budget to one or more subscription-based accounts 102 that need additional budget to boost the subscriber's content. For example, the ecosystem budget manager 210 may dynamically adjust the media budget across the different subscription-based accounts 102 based on properties, habits, relevance, and quality of content of the individual subscription users. In particular, the ecosystem budget manager 210 may receive spending information from a spending tracker 214. The spending tracker 214 may track the spending for each individual subscription-based account 102, and transfer the spending information to the ecosystem budget manager 210. In addition, the ecosystem budget manager 210 may receive boost metric information about the subscription-based accounts 102 from an ecosystem tracker and forecaster 212. For example, the ecosystem tracker and forecaster 212 may monitor and record boost metrics across the messaging platform 101 to provide a top-level overview of the system 100. Then, the ecosystem budget manager 210 may forecast an amount of surplus budget (if any) across all of the subscription-based accounts 102 based on the spending information received from the spending tracker 214 and the boost metric information received from the ecosystem tracker and forecaster 212.

Also, the ecosystem budget manager 210 may adjust the media budget for the subscription-based accounts 102 based on the amount and quality of the subscribing entity's activity on the messaging platform 101. For example, the ecosystem budget manager 210 may receive quality metrics indicating a level of quality associated with the subscribing entity's activity (e.g., whether the content has received a higher amount of engagements, whether it has an image or video, etc.), and then reward certain subscription-based accounts 102 with additional media budget for sharing higher quality content. Further, the ecosystem budget manager 210 may decrease the media budget for subscription-based accounts 102 that has a lower amount of shared messages and/or lower level of quality. For example, if a particular subscription-based account 102 is constantly spamming, the media budget may be lower than what is provided by the monthly fixed fee. On the other hand, if a particular subscription-based account 102 is posting higher quality content, the media budget may be higher than what is provided by the monthly fixed fee. In this manner, the overall quality of the messaging platform 101 may be improved over time.

In further detail, there may be subscription-based accounts 102 that are underperforming in the sense that they are not sharing many messages (or sharing higher quality messages) on the messaging platform 101, and therefore the amplification campaign implemented by the activity booster 232 may be under budget at a particular time in the promotional cycle. Conversely, if all subscription-based accounts 102 are actively performing where its spent media costs meet the media budget of the selected boost tier, then the ecosystem tracker and forecaster 212 may determine that no surplus budget exists, and therefore the boost for each subscription-based account 102 would be consummate with the fixed fee of its assigned boost tier. As such, assuming there are a number of underperforming subscription-based accounts 102, if a particular subscription-based account 102 generates and shares content on the messaging platform 101, in a sense, that particular subscription-based account 102 may be rewarded with additional budget (above their selected boost tier) from the ecosystem budget manager 210.

The network inventory manager 206 may be executed on top of a main advertisement platform (the ads network stack 218). At any point in time, the network inventory manager 206 may determine the amount of ads network stack resources that can be used for the boosting of subscription-based accounts 102. The ads network stack 218 may be the main ads network in which the boosting framework relies upon in order to boost the social media presence for the subscription-based accounts 102. The ads network stack 218 may be a real-time auction engine that dynamically computes relevancy between the content to be promoted and the users and extracts the maximum relevance and yield from the ad inventory. The ads network stack 218 may include a relevance engine 220 that match the user's content with potential users that are more likely to engage with the user's content, and an ads auction 222 that determines pricing for the ad slots that are used to promote the user's content. The network inventory manager 206 may determine overall auction load information about the level of resources used by the ads auction 222 by monitoring the performance of the ads network stack 218. Then, based on the overall auction load information, the network inventory manager 206 may determine the amount of ads network stack resources that currently can be used for the boosting of subscription-based accounts 102.

In view of the information received from the subscription manager 202, the information received from the ecosystem budget manager 210, and the information received from the network inventory manager 206, the boost manager 204 is configured to control which boost options (e.g., profile booster 228, activity booster 232, etc.) are applied to the individual subscription-based accounts 102. In some examples, the boost manager 204 is configured to always activate the profile booster 228, but can selectively active the activity booster 232 based on the level of unused monthly budget, additional overall surplus budget, and the amount of available ads network stack resources. For example, during large events, there is more competition in the ads auction 222, and the bids for individual ad slots may be higher (which can increase the media costs for boosting the content). In this scenario, the boost manager 204 may decrease the boost strength for one or more subscription-based accounts 102 (or all of them), and then spend the saved money at a later point when the ads auction 222 is less loaded. For example, due to the nature of subscription-based promotion, the system 100 may assume that the subscribers will remain the promotional system for a relatively longer period of time. As such, instead of boosting content at a particular relevant moment when the ad competition is relatively high (thereby incurring high media costs), the boost manager 204 may deactivate one or more of the boosting options, thereby saving that unused budget, and then activate one or more of the boosting options at a later time when the ads auction 222 is less loaded (e.g., below a threshold amount). In another example, since the profile booster 228 may be constantly running, the boost manager 204 may receive or determine that a subscription-based account 102 has some remaining budget plus allocated surplus budget of a certain amount, and the boost manager 204 may activate the activity booster 232 for a period of time to boost the subscriber's activity on the messaging platform 101.

The profile booster 228 may boost a profile of the subscription-based account 102. In some examples, the profile booster 228 may always be activated, and the boost provided by the profile booster 228 is not dependent on the user's activity on the messaging platform 101. In other words, the profile booster 228 may be continuously running, and the user will increase their presence on the messaging platform 101 even if the user does not share any messages on the messaging platform 101. All subscription-based accounts 102 may benefit more or less equally from this type of boost. The profile booster 228 may implement an assets/campaign manager 230 to manage the underlying campaigns and assets for the profile booster 228. For example, the assets/campaign manager 230 may programmatically set up and configure the follower campaign. The ads network stack 218 may implement the follower campaign which boosts the profile of the subscription-based account 102 using the relevance engine 220 that programmatically matches the account's profile with the most relevant users at the most relevant times using the machine-learning relevance algorithm described above. In addition, the ads auction 222 is configured to determine the media costs for promoting the account's profile by determining the pricing for the ad slots that are used to promote the user's content.

The profile booster 228 may transmit the promoted profile (or a portion thereof), over the network 150, to be displayed within one or more parts of the social media messaging application 132 for the users that are determined as relevant to the promoted content by the relevance engine 220. In this manner, users may view and/or interact with the promoted content, and then link to subscriber's account (follow, friend, subscribe, track, etc.).

The activity booster 232 may boost the content of one or more messages shared by the user of the subscription-based account 102 to a wider audience on the messaging platform 101. This boost option focuses on boosting (i.e., getting bigger audience for) the user's activity and content on the messaging platform 101. In some examples, the activity booster 232 is activated for only a defined period of time (e.g., 24 hours). As the result, users that are more active on the messaging platform 101 obtain more value out of this boost option, because they produce more content that can be boosted. In some examples, the activity booster 232 may be activated for a relatively short period of time (e.g., 24 hours).

The activity booster 232 may implement an activity filter 234 configured to filter the user's activity on the message platform 101, and select one or more messages for the activity booster 232. For example, there may be very active users that share a number of messages within a relatively short period of time. The activity filter 234 may filter the shared messages and select the ones that are more likely to get better feedback/engagement from the extended audience. In some examples, the activity filter 234 may use the amount of engagements with each shared message (e.g., clicks, shares, comments, etc.), and if a particular message has a higher number of engagements over other shared messages, that particular message may be selected by the activity filter 234 to be boosted to a wider audience on the messaging platform 101. The message that was selected to be boosted may have a picture, gif, or generally more creative content (than just a simple text message), and therefore, the activity filter 234 may select and boost messages having a higher engagement quality, thereby increasing the overall quality of the content exchanged on the messaging platform 101. The activity booster 232 may implement an assets/campaign manager 236 configured to manage the underlying campaigns and assets for the activity booster 232. For example, the assets/campaign manager 236 may programmatically set up and configure the amplification campaign.

The ads network stack 218 may implement the amplification campaign using the relevance engine 220 to programmatically match the subscriber's activity with the most relevant users at the most relevant times. In addition, the ads auction 222 is configured to determine the media costs for promoting the subscriber's activity by determining the pricing for the ad slots that are used to promote the subscriber's activity.

The activity booster 232 may transmit the promoted activity, over the network 150, to be displayed within one or more parts of the social media messaging application 132 for the users that are determined as relevant to the promoted content by the relevance engine 220. In this manner, users may view and/or interact with the promoted content, and then link to subscriber's account (follow, friend, subscribe, track, etc.).

A premium feature manager 238 may implement one or more additional features (e.g., additional boosting options, analytics, special badges, etc.) as provided by the subscription-based account 102. In some examples, the system 100 may offer additional media distribution-based features, and if a particular user selects one or more of these additional options, these options are stored and implemented accordingly by the boost manager 204.

A presence metric tracker 224 is configured to track the presence metrics 225 for each of the individual subscription-based accounts 102, and a boost reporter 216 is configured to generate the boost reports 134 for the subscription-based accounts 102 to give users insight into how much value (reach, engagement, etc.) they get out of boosting their profile and the organic activity on the messaging platform 101, as previously described with reference to FIG. 1. For example, the boost reporter 216 may provide the presence metrics 225 in a user interface of the social media messaging application 132 in the form of the boost report 134. The presence metric tracker 224 may track the number of times users viewed the profile of the subscription-based account 102, the number of messages sent, the number of new linked accounts, the number of engagements with its messages such as the number of times users interacted with the messages, the number of shares, the amount of appreciation signals received (e.g., likes, hearts, etc.).

A relationship tracker 226 is configured to determine relationship levels between the subscribing entity and entities on messaging platform 101 based on an amount of interactions with the subscriber's content, where the social media presence booster 108 can programmatically select content to be boosted based on the determined relationship levels. For example, the relationship tracker 226 is configured to track relationships between an advertiser (e.g., a particular subscription-based account 102) and the users of the messaging platform 101. Since boost is offered to the subscription-based accounts 102 continuously and the system 100 knows that boost will be applied to the advertiser's content in the future, the relationship tracker 226 may log a more detailed track of interaction between the advertiser's content and users on the messaging platform 101, which may allow the system 100 to be more efficient in the future. For example, the relationship tracker 226 may monitor whether or not a user has already viewed content from the subscription-based account 102, and then determine to wait for a period of time before boosting content to that user if the user has already viewed content from the subscription-based account 102 and the period of time from viewing that content to the present time is relatively short. In another example, the relationship tracker 226 may determine that the user is already in a relationship with the subscription-based account 102, and then determine to boost one of the subscriber's messages to that user. In addition, the relationship tracker 226 may facilitate time-aware selection of content, e.g., where it applies stronger boost to content from restaurant accounts during lunch/dinner hours because it knows that users are more likely to be interested in this kind of offering during such hours.

More generally, the relationship tracker 226 can implement relationship builder logic that intelligently creates relationships between the advertiser and the potential customers. For example, instead of boosting the most relevant or engaging content to a particular user or class of users, the relationship tracker 226 may implement a relationship-based advertising approach that, over time, builds relationships with followers/potential followers in a manner that can increase the effectiveness of promoted content. For example, since the system 100 uses a subscription-based model, the system 100 may assume that the subscribing entity will remain on the messaging platform 101 for a relatively longer time, which can lessen the requirement of delivering only the most relevant or engaging content to the potential followers. Rather, the social media presence booster 108 may boost the profile and/or messages more along the lines of how a person builds a relationship with another person based on the more detailed relationship tracking by the relationship tracker 226. For example, the social media presence booster 108 may initially boost a profile of the subscription-based account 102 to a class of potential followers (e.g., accounts having an address within a certain radius of the location of the business of the subscriber-based account) to casually inform the potential followers about the business. Then, after a certain period of lapses, the social media presence booster 108 may boost a message of the subscriber account that contains more detailed information about an event hosted by the business.

Figure 3:
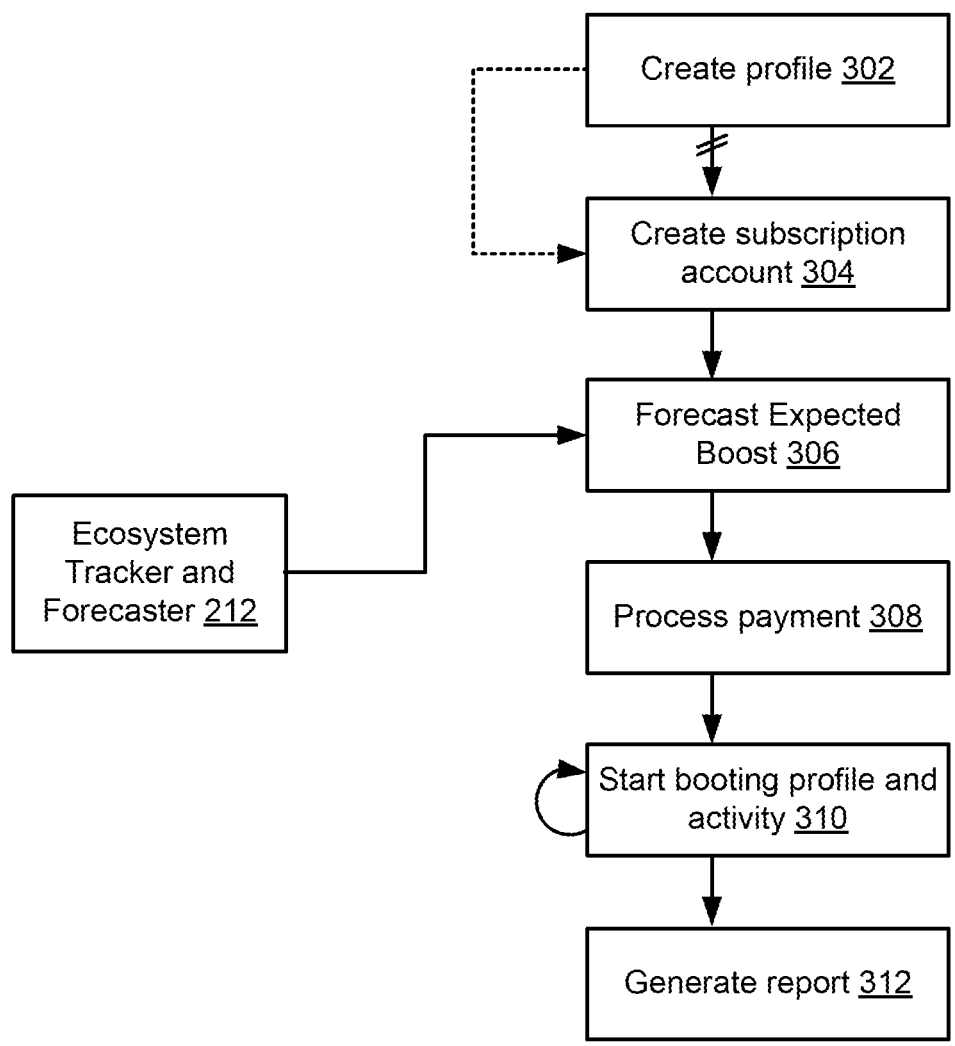
FIG. 3 illustrates a flowchart depicting example operations for registering and activating a subscription-based account according to an implementation.

FIG. 3 illustrates a flowchart 300 depicting example operations for registering and activating a subscription-based account 102 according to an implementation. Although the flowchart of FIG. 3 illustrates the operations in sequential order, it will be appreciated that this is merely an example, and that additional or alternative operations may be included. Further, operations of FIG. 3 and related operations may be executed in a different order than that shown, or in a parallel or overlapping fashion.

A profile may be created (302). For example, when a user first registers on the messaging platform 101, the user creates a network profile. However, if a user is already registered and has a network profile, the user may initially proceed to create a subscription-based account 102 (304). For example, the registration manager 106 may receive information about the underlying entity from the subscribing entity, and store this information in conjunction with the subscription-based account 102. For example, the user may provide a description of the entity, the type of entity, location, the products or services offered, the goal(s) of the entity, whether the entity is local, internet-based, and/or a description of the type of potential customers and where they might be located. In addition, the registration manager 106 may receive the user's budget and the selection of a boosting tier amount a plurality of boosting tier.

In addition, the registration manager 106 is configured to provide a plurality of available boost tiers for selection by the subscribing entity during registration of the subscription-based account 102, where each of the plurality of available boost tiers provides a different level of boost for the subscriber's content. In some examples, the ecosystem tracker and forecaster 212 may forecast the number of increased connections to the subscription-based account 102 for each of the plurality of available boost tiers during the registration, and the registration manager 106 is configured to provide, over the network 150, the forecasted connections to the subscribing entity. For example, the ecosystem tracker and forecaster 212 may determine that selection of a first boost tier can be expected to result in an increase of 10-30 followers, and that the selection of a second boost tier can be expected to result in an increase to 50-100, where the second boost tier may have a higher monthly subscription cost. This information may help the subscribing entity in the selection of the boost tier. In addition, the ecosystem tracker and forecaster 212 may auto-suggest a particular boost tier based on the number of connections within the subscription-based account 102 within the connection graph 104. For example, if the subscribing entity already has 1000 relationships within the connection graph 104, the ecosystem tracker and forecaster 212 may auto-suggest a higher boost tier.

The registration manager 106 is configured to collect compensation from the subscribing entity, and establish a monthly billing cycle for the subscribing entity. After an initial compensation is processed (308), the boosting of the subscriber's profile and activity starts (310). For example, after compensation is processed (and possibly after a verification period), the social media presence booster 108 is configured to start boosting the subscriber's content during the promotional cycle. Then, a boost report can be generated (312). For example, the presence metric tracker 224 collects and computes the presence metrics 225, and the boost reporter 216 provides the presence metrics 225, over the network 150, to the subscribing entity to give the subscribing entity insight into the boost performance. In one example, the subscribing entity may use the social media messaging application 132 to view the boost report 134 at any point during the promotional cycle (e.g., on-demand reporting). In other examples, the boost reporter 216 may communicate the boost report 134 using other communication means, such as emailing the boost report 134 to the subscribing entity at the end of each promotional cycle.

Figure 4:
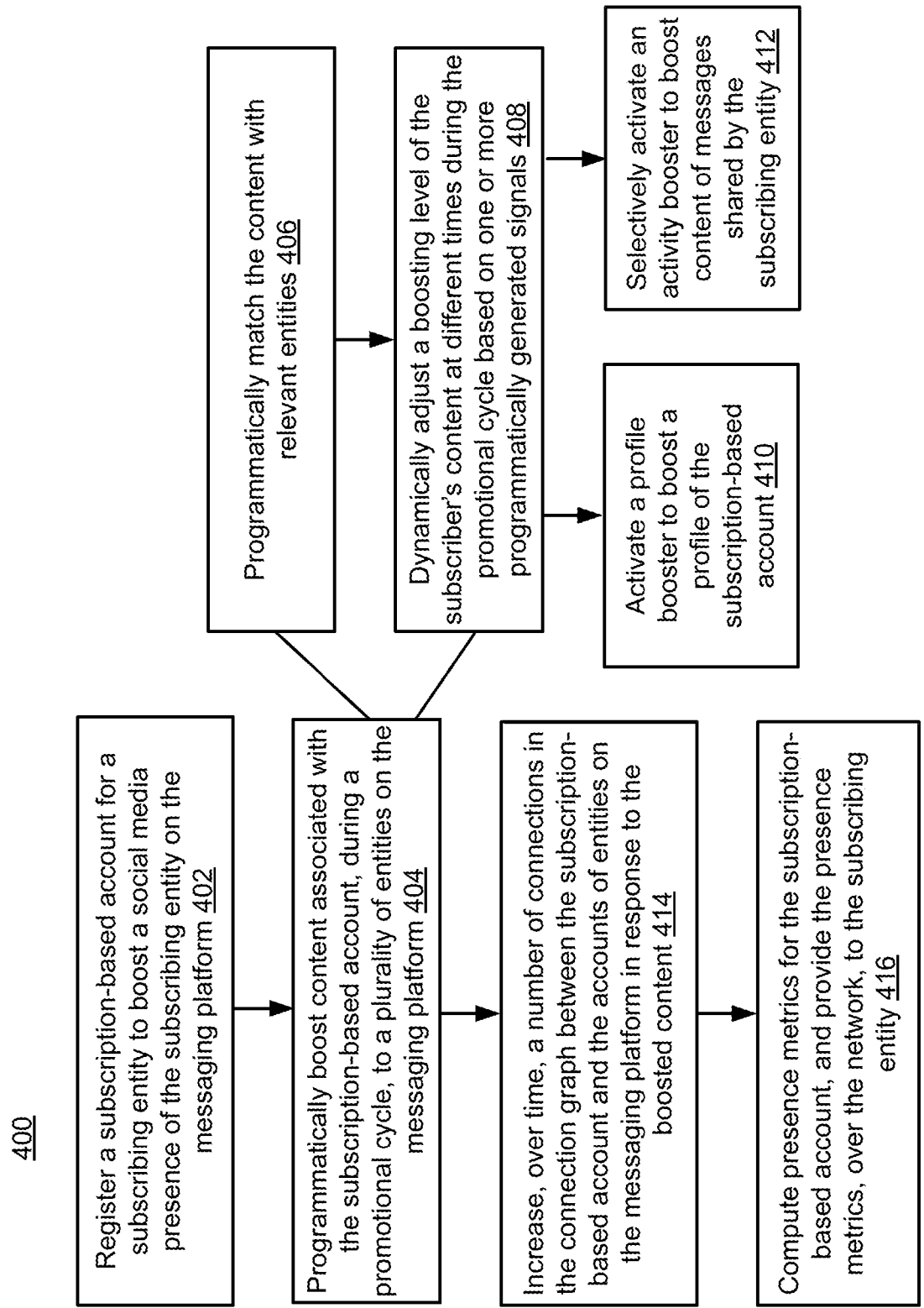
FIG. 4 illustrates a flowchart depicting example operations of the system of FIG. 1 according to an implementation.

FIG. 4 illustrates a flowchart 400 depicting example operations of the system 100 of FIG. 1 according to an implementation. Although the flowchart of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion.

A subscription-based account for a subscribing entity may be registered to boost a social media presence of the subscribing entity on the social media platform (402). As explained with reference to FIGS. 1 and 3, the registration manager 106 is configured to register a subscription-based account 102 for a subscribing entity to boost the subscribing entity's social media presence on the messaging platform 101.

Content associated with the subscription-based account may be programmatically boosted, during a promotional cycle, to a plurality of entities on the messaging platform (404). For example, the social media presence booster 108 is configured to periodically boost the subscriber's content (e.g., profile of subscriber, subscriber's activity on the messaging platform 101) to a plurality of entities (e.g., users having accounts associated with the messaging platform 101) at different points during the promotional cycle of the subscription-based account 102.

The programmatically boost operation may include programmatically matching the content with relevant entities (406). For example, the relevance engine 220 may implement a machine-learning relevance algorithm that programmatically matches the subscriber's content with relevant users of the messaging platform 101 in order to target users having better chances of linking to the subscriber's account. The machine-learning relevance algorithm may receive input signals and predict which users are relevant to the content to be boosted.

The programmatically boost operation may include dynamically adjusting a boosting level of the subscriber's content at different times during the promotional cycle based on one or more programmatically generated signals (408). For example, the boost manager 204 may control a boosting level of one or more boosting options, by increasing or decreasing the boosting level applied to a certain boosting option or the overall boosting level applied across all the boosting options. The boosting level may indicate the aggressiveness of the boosting applied to the subscriber's content (e.g., the higher the boost, the more frequent the subscriber's content is promoted to other users in the messaging platform 101). In some examples, the programmatically generated signals may include a signal indicating an amount of ad network stack resources (from network inventory manager 206), a signal indicating an amount of unused media budget at a point in time during the promotional cycle (from the subscription manager 202), and a signal indicating an amount of allocated surplus media budget across all subscription-based accounts (from the ecosystem budget manager 210). In some examples, the boost manager 204 may execute a scoring algorithm that computes a boosting strength metric based on the programmatically generated signals. In some examples, the boost manager 204 may assign weights to the different programmatically generated signals. Based on the boosting strength metric, the boost manager 204 may dynamically adjust the boosting level of one or more boosting options.

The subscriber's media budget is correlated with the boosting level. For example, if the boost manager 204 applies a higher boosting level, the subscriber will receive additional media budget than if the boost manager 204 applies a lower boost level. The boosting level may be initially set based on the boost tier selected by the subscriber such that employed boosting level has a media budget that is generally consummate with the price point of the selected tier (e.g., X Euros media budget for an X Euros monthly subscription). As such, the level of boost may be dictated by the unused media budget of the subscription-based account 102. However, in some examples, the boost manager 204 may increase the boosting level for the subscription-based account 102 based on an aggregated level of boost already provided across all subscription-based accounts 102. For example, if the ecosystem budget manager 210 determines there is a surplus of media budget across all subscription-based accounts 102, the ecosystem budget manager 210 may allocate a portion of the surplus, thereby providing an increased level of boost to that subscription-based account 102 that is beyond what is provided for under the boost tier. However, in some examples, the boost manager 204 may determine to decrease the boosting level (at least for a period of time) if the ads network stack 218 is requiring a relatively higher level of resources (in terms of processing power/memory and the amount of other ads that are competing for the user at that very moment) which may indicate there is a high demand for ad placement. As such, the boost manager 204 may determine to temporally reduce the boosting level applied to one or more boosting options (or across all the boosting options), and then increase the boosting level at a later point when the ads network stack 218 requires a lesser amount of resources.

The programmatically boost operation may include activating a profile booster to boost a profile of the subscription-based account (410), and selectively activate an activity booster to boost content of messages shared by the subscribing entity (412). The boost manager 204 may activate the profile booster 228, and selectively activate the activity booster 232 depending on the boosting level. In some examples, the boost manager 204 activates the profile booster 228 after the subscription-based account 102 is registered, and the profile booster 228 remains in an active state during the promotional cycle. The profile booster 228 is configured to boost the profile of the subscription-based account 102 to the relevant entities determined by the relevance engine 220. In some examples, the profile booster 228 is configured to boost the profile of the subscription-based account 102 at various different times during the promotional cycle.

The activity booster 232 is configured to boost content of messages shared by the subscribing entity on the messaging platform 1001 to relevant entities determined by the relevance engine 220. In some examples, the boost manager 204 may selectively activate the activity booster 232 to an active state at multiple different times during the promotional cycle. After the activity booster 232 is activated, the activity booster is configured to transition to a de-active state after a short period of time (e.g., 24 hours).

A number of connections in the connection graph between the subscription-based account and the accounts of entities on the messaging platform may increase over time (414) in response to the boosted content. For example, the social media presence booster 108 is configured to increase, during the promotional cycle, the number of connections in the connection graph 104 between the subscription-based account 102 and the accounts of entities on the messaging platform 101 in response to the boosted content. The boosted content may be delivered to a number of entities that do not have connections to the subscription-based account 102 within the connection graph 104. In this manner, the subscriber's content is shown to a larger audience, which increases the probabilities of entities establishing a relationship with the subscribing entity. As a result, the social media presence booster 108 is configured to boost the social media presence of subscription-based accounts 102 on the message platform 101 in a manner that requires zero or minimal effort on the part of the subscribing entity. According to a fixed subscription fee, the social media presence booster 108 can implement zero-effort media distribution campaigns (e.g., zero-effort on the part of the entity) that leverages machine learning relevance algorithms in order to match content to the most relevant users (and at the most relevant times).

Presence metrics for the subscription-based account may be computed, and the presence metrics may be provided, over the network, to the subscribing entity (416). For example, the presence metric tracker 224 collects and computes the presence metrics 225, and the boost reporter 216 provides the presence metrics 225, over the network 150, to the subscribing entity to give the subscribing entity insight into the boost performance.

Figure 6:
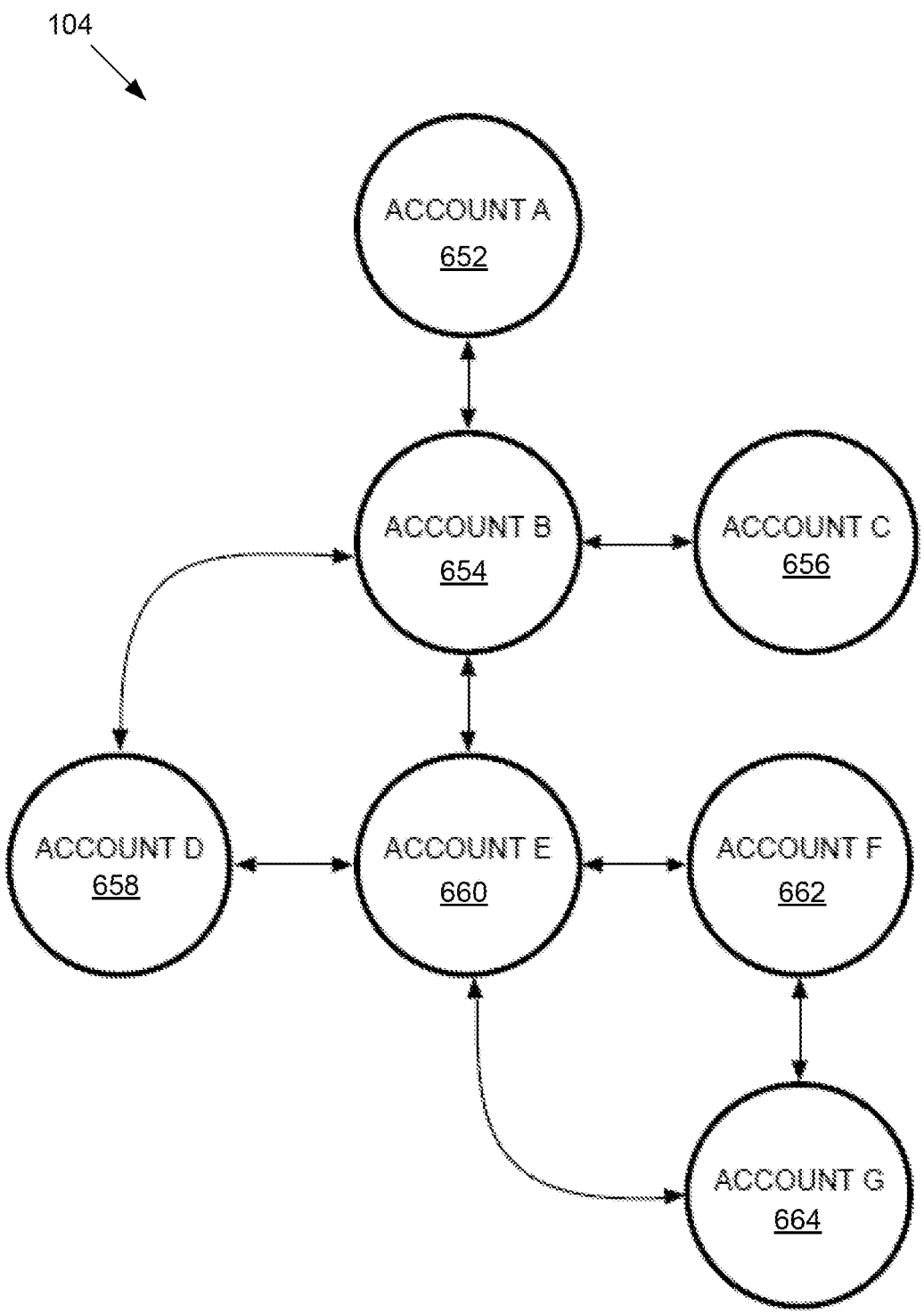
FIG. 6 shows an example depiction of a connection graph of the system of FIG. 1 according to an implementation.

FIG. 6 shows an example depiction of the connection graph 104 according to an implementation. As shown in FIG. 6, the connection graph 104 includes multiple components including nodes representing accounts of the messaging platform 101 (e.g., Account A 652, Account B 654, Account C 656, Account D 658, Account E 660, Account F 662, and Account G 664) and edges representing the relationships among the accounts. The edges of the connection graph 104 may be directed and/or undirected based on the type of relationship (e.g., bidirectional, unidirectional), in accordance with various implementations described herein.

In some examples, the messaging platform 101 may facilitate one-way relationships. For example, a first user may establish a relationship with a second user without having the second user's permission or even making the second person aware of the relationship. The first user may follow the second user to receive and review content from the second user. In some examples the messaging platform 101 may facilitate two-way relationships. For example, the first user may request a relationship with the second user and the second user may approve or acknowledge the relationship so that the two-way relationship may be established. The messaging platform 101 may support one-way or two-way relationships, or both one-way and two-way relationships.

The messaging platform 101 includes functionality to broadcast streams of messages to one or more accounts based at least partially on the connection graph 104. A stream may be a grouping of messages associated with one or more accounts or can reflect any arbitrary organization of messages that is advantageous for the user of an account. In some examples, a "message" is a container for content broadcasted/shared/posted by or engaged by an account of the messaging platform 101. Messages can be authored by users and can include any number of content types (multimedia, text, photos, and video content, including a single video content file that includes a plurality of different video content segments, etc.).

Figure 7:
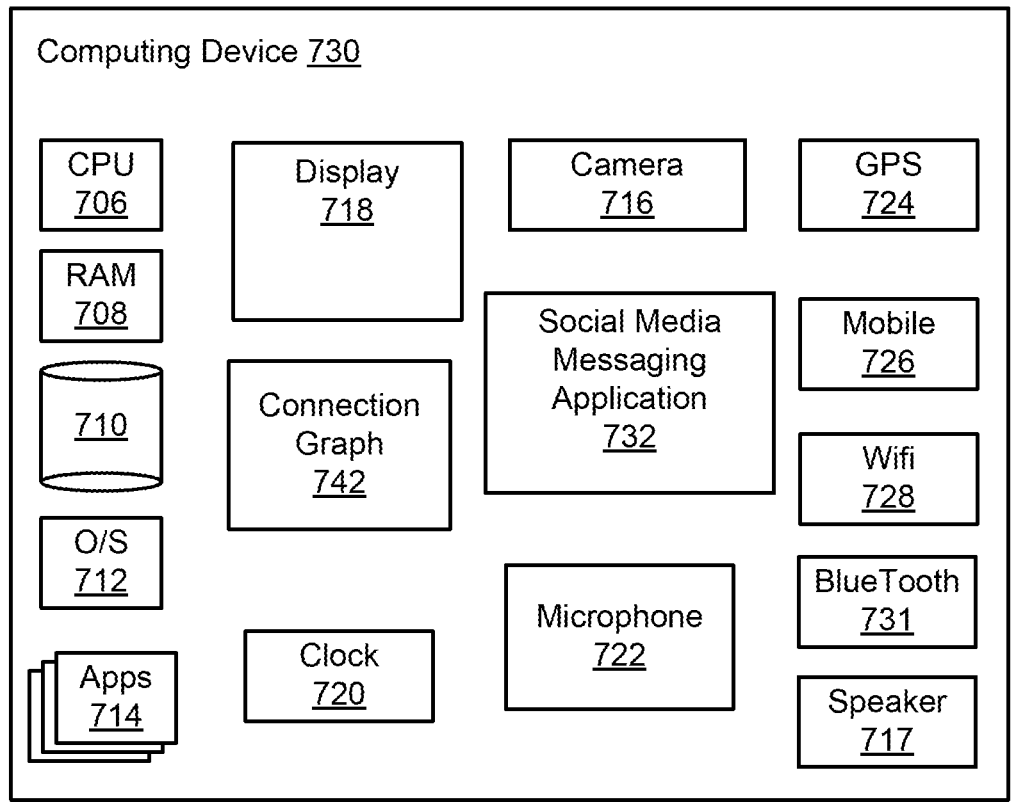
FIG. 7 is a schematic diagram of a computing device of the system of FIG. 1 according to an implementation.

FIG. 7 is a schematic diagram of a computing device 730 according to an implementation. The computing device 730 is a more detailed version of the computing device 130 of FIG. 1.

The computing device 730 may include one or more processors 706 (e.g., a processor formed in a substrate, such as a central processing unit, a graphics processor, etc.), a volatile memory 708, and nonvolatile memory 710. The volatile memory 708 may store, for example, instructions that are executed by the processor(s) 706, and the nonvolatile memory 710 may store, for example, various user data, instructions for executing an operating system, applications, etc.

The computing device 730 may include a plurality of applications 714, which can be executed by the computing device 730 (e.g., by the processor 706 executing one or more instructions stored in memory 708 or 710 that correspond to the application) and which may communicate with the operating system 712 (e.g., through one or more application programming interfaces (APIs)). Execution of the applications 714 can provide various functionalities to a user of the computing device 702. In a few examples, an email application may, with a user's permission, provide access to the user's email account and email messages associated with the account. A browser application may provide a Web browser to a user, so that the user may access content that can be loaded into, and displayed by, the browser application. The application 714 includes a social media messaging application 732 (e.g., the social media messaging application 132 described with reference to FIG. 1). The social media messaging application 732 can provide content to the user from contacts and sources that the user has chosen to be associated with within the messaging platform 101. A camera application can provide access to use of a camera 716 within the computing device 730 for capturing still pictures or video. In some implementations, the camera 716 may be external to the computing device 730, such as a camera that communicates wirelessly, e.g., via BLUETOOTH or Wi-Fi, with the computing device 730. Applications that provide a rich variety of other functionalities and information to the user also can be provided.

The computing device 730 includes a display 718 (e.g., a touchscreen display, an LED display, etc.) that can display a user interface for an application 714 that is being executed by the device. More than one application can be executed at a time. However, in some implementations (e.g., in the case of a smart phone), the size of the display is better suited for a single executing application to be displayed at a time. The executing application that is displayed on the display 718 can be referred to as a "front-facing" application. In some implementations, the display 718 may be housed in a structure separate from a structure housing one or more of the other components of the computing device 702 (e.g., the display 718 is a stand-alone display).

The computing device 730 may include internal speakers 717 that can provide an audio output from the device. The computing device 730 may also include a port or interface (e.g., USB, micro-USB, cable interfaces, HDMI, wireless interface, etc.) that can be used to connect the computing device 730 to external devices, e.g., speakers that may provide an audio output when connected to the device 730 or other types of sensors, cameras, or computing devices. The computing device 730 may also include a microphone 722 that detects sound in the environment of the computing device 730. In some implementations, the microphone 722 may be external to the computing device 730. The microphone 722, whether internal or external, may provide audio for a live video stream.

The computing device 730 may also include a clock 720 that determines a time and date and may include a GPS transceiver 724 that communicates with a global positioning system to determine a location of the computing device 730. The location may be provided as part of the metadata associated with a shared message on the messaging platform 101 or when the social media messaging application 732 is active on the computing device 730, or when the social media messaging application 732 is connected to the messaging platform 101. The computing device 730 also includes various network interface circuitry, such as for example, a mobile network interface 726 through which the computing device 702 can communicate with a cellular network, a Wi-Fi network interface 728 with which the computing device 730 can communicate with a Wi-Fi base station, a BLUETOOTH network interface 731 with which the computing device 730 can communicate with other BLUETOOTH devices (e.g., an external camera, microphone, or speakers), and/or an Ethernet connection or other wired connection that enables the computing device 730 to access the network 150 of FIG. 1. The computing device 730 may include other sensors (not shown), such as, for example, an ambient light sensor, a temperature sensor, physical orientation sensors, and/or an accelerometer, etc. In some examples, a connection graph 742 may be a subset of the connection graph 168 that resides on the server computer 160. For example, the connection graph 742 may be a data set that stores relationships between social media accounts, as shown in FIG. 6. Relationships may include friending, following, linking, or some other relationship. An entity is directly connected to another entity in the connection graph 742 when the two entities are connected by a path length of one, i.e., there are no intervening nodes.

A user of the social media messaging application 732 may view its timeline providing a stream of messages broadcasted by other linked users and promoted content (e.g., promoted by the social media presence booster 108), as well as broadcast messages to other users on the messaging platform 101. The user may use the social media messaging application 732 to engage with the content displayed by the social media messaging application 732 such as posting comments, re-sharing, favoritizing, liking, or other engagements that specify an engagement with the content.

Figure 8:
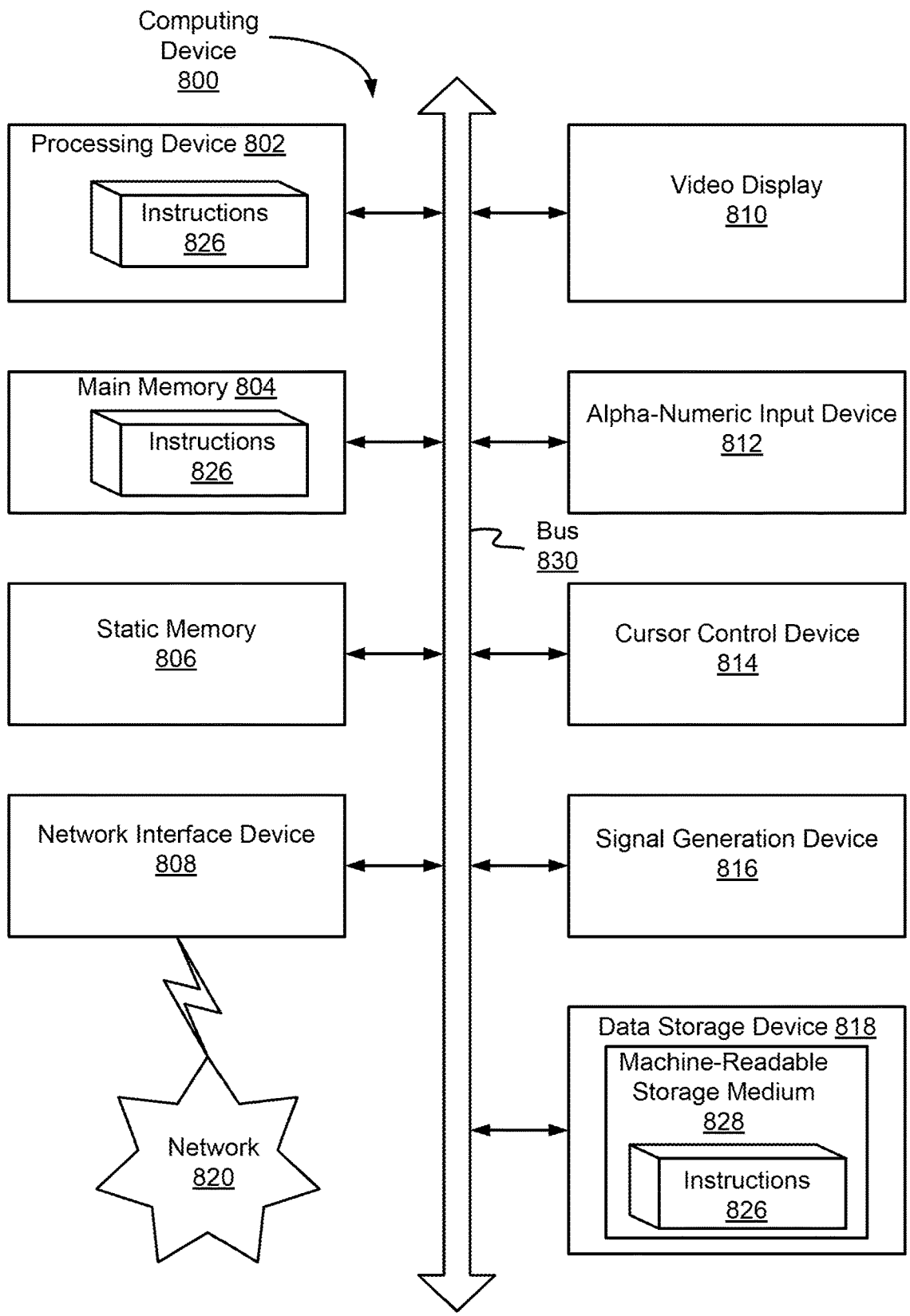
FIG. 8 is a schematic diagram of a computing device of the system of FIG. 1 according to an implementation.

FIG. 8 is a diagrammatic representation of a machine in the example form of a computing device 800 within which a set of instructions, for causing the machine to perform any one or more of the functions of the messaging platform 101 (including the social media presence booster 108) that executes on the server computer of FIG. 1 according to an implementation. The computing device 800 may be a rack-mount server, a server computer, or a mainframe computer, within which a set of instructions, for causing the machine to perform any one or more of the functions with respect to the messaging platform 101 discussed herein. In some examples, the computing device 800 may operate in the capacity of a server machine in client-server network environment. Further, while only a single machine is illustrated, the term "machine" shall also be taken to include any collection of machines that individually or jointly execute a set (or multiple sets) of instructions to perform any one or more of the functions of the messaging platform 101 discussed herein.

In some examples, the computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 818, which communicate with each other via a bus 830.

In some examples, processing device 802 represents one or more processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the functions and steps discussed herein.

In some examples, the computing device 800 may further include a network interface device 808 which may communicate with a network 820. In some examples, the network 820 may be the network 150 of FIG. 1. In some examples, the computing device 800 may be associated with a video display unit 810 (e.g., a liquid crystal display (LCD) or a cathode ray tube (CRT)), an alphanumeric input device 812 (e.g., a keyboard), a cursor control device 814 (e.g., a mouse) and a signal generation device 816 (e.g., a speaker). In some examples, the video display unit 810, the alphanumeric input device 812, and the cursor control device 814 may be combined into a single component or device (e.g., an LCD touch screen).

The data storage device 818 may include a computer-readable storage medium 828 on which is stored one or more sets of instructions 826 embodying any one or more of the methodologies or functions described herein. The instructions 826 may also reside, completely or at least partially, within the main memory 804 and/or within the processing device 802 during execution thereof by the computing device 800, the main memory 804 and the processing device 802 also constituting computer-readable media. In some examples, the instructions may further be transmitted or received over the network 820 via the network interface device 808.

While the computer-readable storage medium 828 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

What is claimed is:

1. A system for digital information retrieval in a social media platform, the system comprising:
a messaging platform, executable by a server, configured to exchange, over a network, messages between users of computing devices based on a connection graph, the connection graph including nodes representing user accounts and links between the nodes representing relationships between the user accounts; and
a client application, executable by a computing device, configured to transmit, over the network, messages posted by a user of the client application to the messaging platform such that the messaging platform routes the messages to computing devices associated with user accounts linked to a user account of the user in the connection graph,
wherein the messaging platform is configured to:
filter the messages posted by the user to select a candidate message among the messages, wherein the messages are filtered based on at least one of quality metrics associated with the messages or an amount of engagements associated with the messages;
compute, using a machine-learning algorithm inputted with relevance signals, a relevance level between content of the candidate message and a user account not linked to the user account of the user of the client application in the connection graph, the relevance signals including one or more signals representing the content of the candidate message and one or more signals representing information about the user account not linked to the user account of the user of the client application; and
transmit the candidate message to a computing device associated with the user account not linked to the user account of the user of the client application in response to the relevance level being greater than a threshold level.

2. The system of claim 1, wherein the machine-learning algorithm is configured to apply weights to the relevance signals to compute the relevance level between the content of the candidate message and the user account not linked to the user account of the user of the client application, the machine-learning algorithm configured to periodically update the weights based on actual selections of users.

3. The system of claim 1, wherein the messages posted by the user include a first message having text and an image, and a second message having only text, the first message having a content quality metric higher than a content quality metric of the second message, wherein the first message is selected as the candidate message.

4. The system of claim 1, wherein the messages posted by the user include a first message and a second message, the second message having a number of engagements higher than a number of engagements associated with the first message, wherein the second message is selected as the candidate message.

5. The system of claim 1, wherein the messaging platform is configured to compute, using the machine-learning algorithm, a secondary relevance level between a profile of the user of the client application and a secondary user account not linked to the user account of the user of the client application in the connection graph, the messaging platform is configured to identify the profile of the user of the client application in a timeline of the secondary user account in response to the secondary relevance level being greater than a threshold level.

6. The system of claim 1, wherein the machine-learning algorithm includes an artificial intelligence algorithm configured to provide one or more computers with an ability to learn about relevance between content and users without being explicitly programmed.

7. The system of claim 1, wherein the relevance signals include signals representing a location associated with the user account of the user of the client application and a location associated with the user account not linked to the user account of the user of the client application in the connection graph.

8. The system of claim 1, wherein the messaging platform is configured to:
Identify an interaction with one or more of the messages by a user of the user account not linked to the user account of the user of the client application;
delay transmission of the candidate message during a waiting period; and
transmit the candidate message in response to an expiration of the waiting period.

9. The system of claim 1, wherein the message platform is configured to determine a time of when to send the candidate message and transmit the candidate message at the determined time.

10. A method for digital information retrieval in a social media platform, the method comprising:
routing, by a messaging platform executable by a server, messages posted by a user of a client application, over a network, to computing devices associated with user accounts linked to a user account of the user in a connection graph, the connection graph including nodes representing user accounts and links between the nodes representing relationships between the user accounts;
filtering, by the messaging platform, the messages posted by the user to select a candidate message among the messages based on an amount of engagements associated with the messages, the engagements including at least one of signals of appreciations, comments, or re-shares of the messages;
computing, using a machine-learning algorithm inputted with relevance signals, a relevance level between content of the candidate message and a user account not linked to the user account of the user of the client application in the connection graph, the relevance signals including one or more signals representing the content of the candidate message and one or more signals representing information about the user account not linked to the user account of the user of the client application;
identifying, by the messaging platform, a period of time to transmit the candidate message; and
transmitting, by the messaging platform, the candidate message to a computing device associated with the user account not linked to the user account of the user of the client application during the period of time in response to the relevance level being greater than a threshold level.

11. The method of claim 10, further comprising:
applying, by the machine-learning algorithm, weights to the relevance signals to compute the relevance level between the content of the candidate message and the user account not linked to the user account of the user of the client application; and
periodically updating, by the machine-learning algorithm, the weights based on actual user selections.

12. The method of claim 10, wherein the filtering step includes filtering the messages based on quality metrics associated with the messages, wherein a message has a higher quality metric if the messages includes an image or video.

13. The method of claim 10, wherein the filtering step includes selecting a message having a highest number of engagements as the candidate message.

14. The method of claim 10, further comprising:
computing, using the machine-learning algorithm, a secondary relevance level between a profile of the user of the client application and a secondary user account not linked to the user account of the user of the client application in the connection graph; and
identifying the profile of the user of the client application in a timeline of the secondary user account in response to the secondary relevance level being greater than a threshold level.

15. The method of claim 10, wherein the machine-learning algorithm includes an artificial intelligence algorithm configured to provide one or more computers with an ability to learn about relevance between content and users without being explicitly programmed.

16. The method of claim 10, wherein the relevance signals include signals representing a location associated with the user account of the user of the client application and a location associated with the user account not linked to the user account of the user of the client application in the connection graph.

17. The method of claim 10, further comprising:
identifying an interaction with one or more of the messages by a user of the user account not linked to the user account of the user of the client application;
delaying transmission of the candidate message during a waiting period; and
transmitting the candidate message in response to an expiration of the waiting period.

18. A non-transitory computer-readable medium storing executable instructions that when executed by at least one processor cause the at least one processor to:
route, by a messaging platform executable by a server, messages posted by a user of a client application, over a network, to computing devices associated with user accounts linked to a user account of the user in a connection graph, the connection graph including nodes representing user accounts and links between the nodes representing relationships between the user accounts;

filter the messages posted by the user to select a candidate message among the messages, wherein the messages are filtered based on a combination of quality metrics associated with the messages and an amount of engagements associated with the messages;

compute, using a machine-learning algorithm inputted with relevance signals, a relevance level between content of the candidate message and a user account not linked to the user account of the user of the client application in the connection graph, the relevance signals including one or more signals representing the content of the candidate message and one or more signals representing information about the user account not linked to the user account of the user of the client application; and transmit the candidate message to a computing device associated with the user account not linked to the user account of the user of the client application in response to the relevance level being greater than a threshold level.

19. The non-transitory computer-readable medium of claim 18, further comprising:

apply, by the machine-learning algorithm, weights to the relevance signals to compute the relevance level between the content of the candidate message and the user account not linked to the user account of the user of the client application; and periodically update, by the machine-learning algorithm, the weights based on actual selections of users.

20. The non-transitory computer-readable medium of claim 18, wherein the messages posted by the user include a first message having video data, and a second message having only text, the first message having a content quality metric higher than a content quality metric of the second message.

21. The non-transitory computer-readable medium of claim 18, further comprising:

compute, using the machine-learning algorithm, a secondary relevance level between a profile of the user of the client application and a secondary user account not linked to the user account of the user of the client application in the connection graph; and identify the profile of the user of the client application in a timeline of the secondary user account in response to the secondary relevance level being greater than a threshold level.

22. The non-transitory computer-readable medium of claim 18, wherein the machine-learning algorithm includes an artificial intelligence algorithm configured to provide one or more computers with an ability to learn about relevance between content and users without being explicitly programmed.

23. The non-transitory computer-readable medium of claim 18, wherein the relevance signals include signals representing a location associated with the user account of the user of the client application and a location associated with the user account not linked to the user account of the user of the client application in the connection graph.

24. The non-transitory computer-readable medium of claim 18, further comprising:

identify an interaction with one or more of the messages by a user of the user account not linked to the user account of the user of the client application;

delay transmission of the candidate message during a waiting period; and transmit the candidate message in response to an expiration of the waiting period.

25. The non-transitory computer-readable medium of claim 18, further comprising:

determine a time of when to send the candidate message, wherein the candidate message is transmitted at the determined time.

\* \* \* \* \*